(No Model.)
D. DODD.
NUT LOCK.
No. 390,212. Patented Oct. 2, 1888.
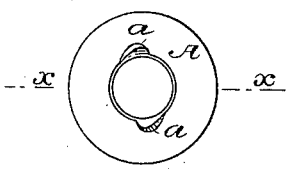
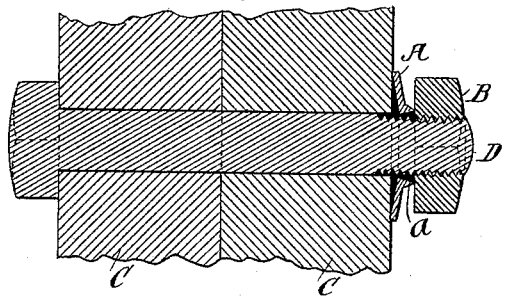
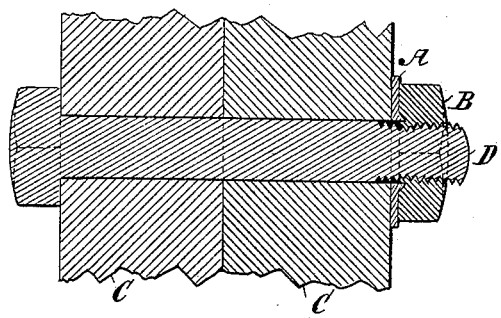
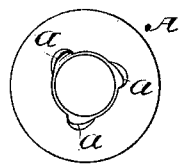 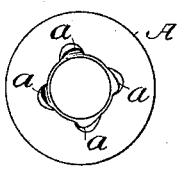 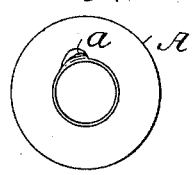
Witnesses
Geo. Wadman
A. M. Jones.
Inventor
David Dodd
Per Edw. E. Lumby
Atty.

UNITED STATES PATENT OFFICE.

DAVID DODD, OF ORANGE, ASSIGNOR TO THE NATIONAL LOCK WASHER COMPANY, OF NEWARK, NEW JERSEY.

NUT-LOCK.

SPECIFICATION forming part of Letters Patent No. 390,212, dated October 2, 1888.

Application filed June 29, 1888. Serial No. 278,548. (No model.)

*To all whom it may concern:*

Be it known that I, DAVID DODD, of Orange, New Jersey, have invented a certain Improvement in Resilient Dished Washers, of which the following is a specification.

This invention is an improvement upon the resilient conoidal washer provided with a rib extending entirely around its inner edge and projecting to a uniform distance laterally therefrom in position to impinge upon the face of the nut in connection with which the washer is used, whereby, when the nut is being screwed home and the conoidal washer is being flattened out against the surface of the object through which the bolt is inserted, a portion of the metal of the nut is by the impingement of the rib displaced and forced convergently against the bolt.

The object of the present invention is to increase the adaptability of lock-washers of the character described for employment with bolts and nuts used in connection with wooden structures. To this end the inner edge of the conoidal or dished washer, instead of being provided with the said laterally-projecting continuous rib, is provided with one or more projections, the apex or apices of which are preferally spirally inclined in the opposite direction from that of the pitch of the bolt and nut screw-threads. By this construction the projections or plows with which the dished washer is provided perform their displacing function upon the metal of the nut progressively in a circular path. This greatly diminishes the pressure with which the dished washer during the performance of the displacing operation bears upon the surface of the object through which the bolt is inserted as compared with the pressure so exerted when the said continuous rib is employed, and increases the adaptability of the dished washer for employment with bolts and nuts used in connection with wooden structures by diminishing the extent to which the outer edge of the washer tends to indent itself into the wood during the performance of the said displacing operation.

The accompanying drawings, showing dished washers embodying the present invention and illustrating the use thereof, are as follows, viz:

Figure 1 is a top view of a dished washer provided around its inner edge with two lateral projections or plows. Fig. 2 is a transverse section through the line $x\ x$ on Fig. 1. Fig. 3 is a sectional view of a bolt, an object through which the bolt is inserted, a nut applied to the bolt, and a dished washer interposed between the nut and the object through which the bolt is inserted. Fig. 4 is a sectional view similar to Fig. 3, except that it shows the nut screwed home, and exhibits in an exaggerated way the displacement of the metal of the nut caused by the impingement upon its face of the projections with which the washer is provided. Figs. 5 and 6 are top views of dished washers provided, respectively, with three and four equidistant plows. Fig. 7 is a top view of a dished washer provided around its inner edge with but one plow.

The washer A is a dished ring of comparatively thin flat steel provided around its inner edge with one, two, three, or more laterally-projecting ribs or plows, each of which is indicated by the letter $a$, and each of which has its apex spirally inclined in a direction opposite that of the pitch of the thread of the nut B.

In Fig. 3 the dished washer A is represented as being interposed between the nut B and the object, C, through which the bolt D is inserted. The face of the nut adjacent to the object through which the bolt is inserted is represented as having just acquired contact with the apices of the plows $a\ a$.

In Fig. 4 the nut is represented as screwed home, whereby the plows $a\ a$ have been caused to embed themselves into the face of the nut, and to displace and convergently compress upon the bolt a portion of the metal of the nut, while the central portion of the washer has been compressed into the same plane as the outer portion.

The washer A is made of suitably-hardened steel, and hence bears with elastic pressure on one side against the face of the object through which the bolt is inserted and on the other side against the nut. Owing to the resistance which the dished washer opposes to compression, the plows *a a* begin their work of displacing the metal of the nut and effecting its convergent motion toward the bolt when the parts have acquired the position in which they are represented in Fig. 3, and such convergent movement continues to be progressively effected in a circular path, while the washer is gradually yielding to the compression due to the screwing home of the nut and until the parts acquire the relative positions in which they are represented in Fig. 4.

It is to be understood that the dishing of the washer may be varied in shape and may be either more or less shallow than that represented in the drawings without departure from the invention, so long as the inner edge of the washer is provided with the spirally-inclined plows, as described.

In practice the dished washers will be given a rather low spring temper, in order that they may yield to compression without breaking.

What is claimed as the invention is—

1. The new article of manufacture herein shown and described, the same consisting of a dished washer provided with spirally-inclined projections or plows adjacent to the inner edge of that one of its sides which is intended for impact against the face of the nut.

2. The combination, as herein set forth, of a bolt and nut of ordinary construction with a dished washer provided upon that one of its sides which bears against the nut with a spirally-inclined projection or plow, the apex of which, after it has acquired contact with the nut, is made by the screwing home of the nut to displace the metal thereof progressively in a circular path, and to thereby effect the convergent movement of a portion of the metal of the nut toward the bolt while the central portion of the washer is being forced toward and against the surface of the object upon which the outer portion of the washer bears.

DAVID DODD.

Witnesses:
 JOHN H. PIPER,
 A. M. JONES.